E. WEINTRAUB.
TRANSMITTING ALTERNATING CURRENT THROUGH A VAPOR.
APPLICATION FILED MAR. 23, 1903.
1,115,631.
Patented Nov. 3, 1914.
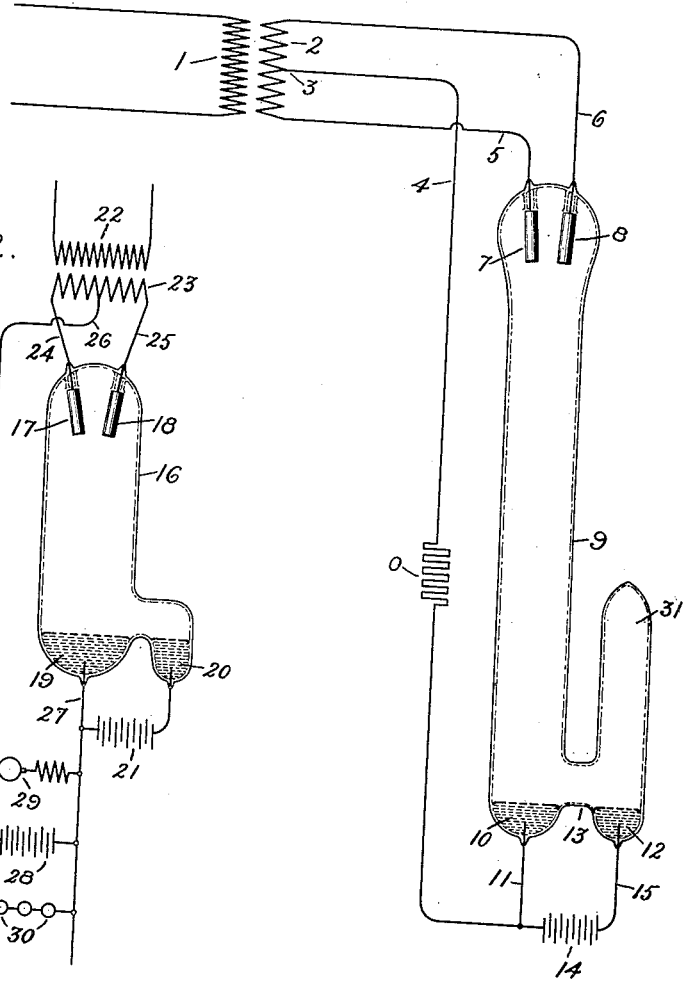
Witnesses.
George H. Tilden
Helen Orford
Inventor.
Ezechiel Weintraub.
by Albert G. Davis
Att'y.

UNITED STATES PATENT OFFICE.

EZECHIEL WEINTRAUB, OF SCHENECTADY, NEW YORK, ASSIGNOR TO GENERAL ELECTRIC COMPANY, A CORPORATION OF NEW YORK.

TRANSMITTING ALTERNATING CURRENT THROUGH A VAPOR.

1,115,631.

Specification of Letters Patent. Patented Nov. 3, 1914.

Application filed March 23, 1903. Serial No. 149,081.

*To all whom it may concern:*

Be it known that I, EZECHIEL WEINTRAUB, a subject of the Czar of Russia, residing at Schenectady, county of Schenectady, State of New York, have invented certain new and useful Improvements in Transmitting Alternating Current Through a Vapor, of which the following is a specification.

My invention relates to the transmission of alternating electric current through the medium of a vapor.

In one of its aspects my invention contemplates utilizing the energy of the current in the vapor itself, in which case the energy is more or less completely converted into light. From this standpoint therefore, my invention relates to the electric production of light.

The flow of current from an alternating current source through a vapor in contact with its liquid which constitutes a terminal, such as the vapor of mercury, of amalgams, or of alkali metals, is, as I have found, unidirectional, that is to say, waves of current of one polarity are permitted to pass while waves of opposite polarity are suppressed. By utilizing the energy of the current, so far as may be, elsewhere than in the vapor itself, the operation of my invention is therefore that of a rectifier. The generation of light by the passage of current through the vapor is therefore in the latter case an incidental matter.

Various features of novelty are characteristic of my invention whether the same be utilized chiefly for the production of light, or for securing the rectification of alternating current, or for both, and these features of novelty as well as other features of novelty of more limited scope I have pointed out with particularity in the appended claims.

The invention itself will be better understood by reference to the following specification taken in connection with the accompanying drawings in which—

Figure 1 represents in diagram a novel means for producing light by current derived from an alternating current source; Fig. 2 represents in diagram a means for rectifying alternating current, the energy in this case being chiefly utilized elsewhere than in the rectifying device itself.

A source of alternating current is employed such that an intermediate potential may be obtained. This may be afforded by a generator having a tap leading from an intermediate point in the generating winding, or by a compensator with a suitable tap, or by a transformer as shown in the drawings in which 1 represents the primary, receiving current from any suitable source, and 2 the secondary provided with an intermediate tap 3 located preferably at the central point in the winding. From this tap and from the outside terminals of the winding extend leads 4, 5 and 6. The leads 5 and 6 are electrically connected to electrodes 7, 8 located within an enlarged portion of a highly exhausted envelop 9 of glass or any other suitable material. The enlargement is provided merely for the purpose of accommodating the electrodes without crowding. The electrodes 7 and 8 are formed of some non-vaporizable material such as iron or artificial graphite.

In the bottom of the receptacle or envelop 9 is a body of mercury 10 with which the lead 4 is electrically connected by a leading-in wire 11. Also in the bottom of the receptacle and adjacent to the body of mercury 10 is another body of mercury 12, which, however is separated from the first mentioned body of mercury by an upwardly projecting wall 13 forming a portion of the receptacle. A source of direct current, such for example as a small storage battery 14, is connected between the two bodies of mercury 10 and 12, the connections being made to their respective leading-in wires 11 and 15.

The envelop or receptacle 9, to which reference has already been made, is of some light-transmitting material and, in the form shown, consists of a tube of a length dependent upon the voltage of the alternating current. Communicating with the main tube 9 and integral therewith is an upwardly extending supplemental chamber or tube 31 located as far away from the upper portion of the main tube as may be. The purpose of this supplemental tube is to serve as a cooling means or condensing chamber for the mercury vapor which exists in the lamp when the lamp is in operation. The condensing chamber serves to keep down the amount of the mercury vapor and as a consequence prevents the lamp voltage from rising unduly, thereby rendering the lamp more stable in operation. A distinct advantage incident to the location of the condensing chamber separate from the main or light-giving tube 9 is that the globules of mercury as they are produced by condensation of mercury vapor, do not, when they drop back to the bottom of the chamber, interfere with the production of light and cause the light to flicker as would be the case if the chamber were located at the top of the tube 9. In this latter case it would of course be evident that the globules of mercury in dropping down into the heated portion of the tube are again evaporated more or less thus counteracting the effect of the condensing chamber in the top of the tube.

In order to start up the apparatus described, the bodies of mercury 10 and 12 are caused, by any suitable means, to come into temporary engagement with each other, thereby completing an electric circuit for the source of current or storage battery 14. Upon the cessation of this momentary contact or engagement between the bodies of mercury 10 and 12, the circuit is broken, thereby springing an arc or electric discharge between these bodies of mercury. Various means may be employed for bringing the bodies of mercury into temporary electrical engagement. For example, the lower end of the receptacle may be slightly shaken so as to cause mercury to flow over the wall 13 and back again, thus momentarily completing and then breaking the circuit of the battery 14 which thereupon operates to produce a small arc or discharge in the receptacle. Instead of performing this operation manually, it is obvious that various automatic devices may be employed such for example as a magnetically-controlled displacing device floating normally in one of the bodies of mercury which, under these conditions, is in sufficient quantity to cover the bridge 13. Upon the withdrawal of this displacing device, the level of the mercury sinks until the arc is sprung as the level falls below the level of the bridge 13. After the auxiliary arc or discharge has been once started, the production of mercury ions, or in other words, mercury vapor generated as a result of electrical action, has the effect of rendering the receptacle conductive for currents flowing in one direction but not in the opposite direction. It will therefore be understood that as the electrodes 7 and 8 vary in potential from positive to negative, current will flow from each of these electrodes to the main mercury electrode 10 when its potential is positive and will cease to flow when its potential becomes negative. As the electrodes 7 and 8 are always of opposite polarity, it will therefore be seen that current pulsations of the same polarity flow alternately from the electrodes 7 and 8 to the main mercury electrode 10. The return circuit for these unidirectional pulsations of current is afforded by the return conductor 4 in which a steadying resistance or inductance O may be inserted as indicated.

The presence of the auxiliary arc or discharge operated continuously by the storage battery or other source of direct current 14, is necessary to the continuation of the flow of current through the receptacle 9. If this auxiliary arc or discharge were interrupted, the current from the alternating current source would instantly cease to flow and the apparatus would be put out of operation. This auxiliary arc apparently operates to start the flow of current pulsations due to the alternating current source each time the potential of the electrodes 7 and 8 commences to rise from zero in the proper direction. When these electrodes 7 and 8 are of non-vaporizable material such as described, this flow of current is such that the electrodes 7 and 8 are anodes and the coöperating mains or common mercury electrode 10 is a cathode. Each time then that the potential of the electrode 7 passes through zero and commences to rise in the positive direction, current flows therefrom toward the cathode 10, while in a similar manner current flows from the other electrode 8 to the cathode 10. The current flow therefore alternates between the electrodes 7 and 8, current flowing in regular and immediate succession first from one and then from the other.

I have set forth in connection with the description of Fig. 1, how the current flow through the lamp or receptacle 9 consists of a series of immediately recurring pulsations of current of the same polarity. In Fig. 1 the energy of the electric current is utilized wholly for the purpose of generating light. The energy derived from the alternating current source, however, being in the form of unidirectional pulsations of current, may be utilized elsewhere than in the lamp or vapor-containing receptacle. In this case the apparatus becomes a rectifier, such light as is then produced by the apparatus being merely incidental. Fig. 2 shows my invention as a rectifier, in which case the vapor-containing receptacle is made much shorter than in Fig. 1 so as to require a less voltage for its operation. The voltage in excess of that consumed by the rectifier is then available for use in translating devices of any suitable character. The receptacle is indicated at 16 and is provided with the upper electrodes 17 and 18 similar to the electrodes 7 and 8 of Fig. 1. The lower main terminal of the lamp consists of a body of mercury 19 and with this coöperates the auxiliary electrode 20 consisting also of a body of mercury. The energy for the auxiliary arc between these mercury electrodes is supplied by a storage battery 21 or other suitable source of direct current.

The alternating current source, for operation in conjunction with the rectifier, may assume a variety of forms but in the present instance is shown for purposes of illustration as consisting of a transformer having a primary 22 and a secondary 23. From the main terminals of the latter extend leads 24 and 25 connecting respectively with the upper electrodes 17 and 18 of the rectifier. An intermediate point in the transformer secondary is connected through a lead 26 with a circuit containing translating devices. The translating device circuit is completed by the lead 27 extending to the main terminal or cathode 19 of the rectifier. The translating devices may be of various kinds such for example as a storage battery 28, a direct current motor 29, or lights 30. The rectifier is started in the same manner as the lamp in Fig. 1, and when in operation supplies the translating devices with a practically continuous though pulsating current.

In connection with the devices shown in Figs. 1 and 2, I may remark that the auxiliary arc or discharge which operates to permit the flow of current from the alternating-current source, while it must be continuous for such periods as it is desired that current from said source should flow, need not be of any considerable magnitude. Thus for example a current of 10 amperes from the alternating-current source may be maintained through the agency of an expenditure of somewhere in the neighborhood of one quarter to one-half of an ampere in the circuit of the auxiliary arc. Also, it is to be noted that the best results are secured, as I have found, when the vacuum in the envelop or receptacle is extremely high.

What I claim as new and desire to secure by Letters Patent of the United States, is,

1. The combination of an envelop or inclosure, means for producing within said inclosure a continuous liberation of ionized vapor, a source of alternating current, a plurality of electrodes in said inclosure connected with said source, and a coöperating electrode affording a return path for current supplied from said source to the first mentioned electrodes.

2. The combination of a source of single-phase alternating current, an exhausted receptacle, electrodes therefor one at least of which is of vaporizable material, connections between some of said electrodes and the terminals of said source, a connection between another of said electrodes and a point of intermediate potential on said source, and means independent of said source for generating ionized vapor from the substance of the last mentioned electrode.

3. In an electric lamp, the combination of an exhausted receptacle, electrodes therefor, one at least of which is of vaporizable material, means for rendering the interior of said receptacle conductive for current flowing in one direction through the receptacle, a source of single-phase alternating current, and connections between said receptacle and said source for supplying to said receptacle a continuous succession of unidirectional waves of current.

4. The combination of a source of alternating current, an envelop or receptacle, electrodes for said envelop, and continuously operating means independent of said source for rendering the interior of said envelop conductive for current waves of both polarities from said source.

5. The combination of a winding, means for generating in said winding an alternating electromotive force, an exhausted envelop, electrodes therefor one at least of which is of vaporizable material, a connection from a vaporizable electrode to an intermediate point in said winding, a connection from other points in said winding to other electrodes in said envelop, and means independent of said winding for generating ionized vapor in said envelop.

6. The method of causing a continuous succession of current waves from a single-phase alternating current source through a vapor conducting-medium, which consists in rendering said medium conductive for current waves of a single direction, and then causing current to flow first from one terminal of said source and then from the other through circuits including said vapor conducting-medium.

7. The combination of an exhausted envelop provided with electrodes, a source of single phase alternating current, means independent of said source for rendering the interior of said envelop conducting for currents of a given direction, and means for causing energy derived from both polarity waves of the alternating current to flow through said envelop.

8. The combination of a winding generating single-phase alternating current, an exhausted envelop, a plurality of paths in said envelop for current from said winding, means independent of said winding for continuously rendering the said paths conducting, and an energy-consuming device traversed by current flowing through both of said paths.

9. In a rectifier for single-phase alternating current, the combination of an exhausted envelop, electrodes therefor, a source of single-phase alternating current, means for deriving positive and negative waves of current from said source, means independent of said source for rendering said envelop conducting for waves of both polarities, and a current-consuming device or devices traversed by the resulting flow of current through said envelop.

10. The combination of an exhausted receptacle, a plurality of electrodes of non-vaporizable material, a coöperating vaporizable electrode, means for impressing electro-motive forces of opposite polarity upon said non-vaporizable electrodes, a return circuit leading from the vaporizable electrode, current-consuming devices in said return circuit, and means independent of the electro-motive forces impressed upon said electrodes for continuously generating ionized vapor in said receptacle.

11. The combination of an exhausted receptacle a plurality of electrodes of non-vaporizable material, a coöperating vaporizable electrode, means for impressing electro-motive forces of opposite polarity upon said non-vaporizable electrodes, a return circuit leading from the vaporizable electrode, current-consuming devices in said return circuit, and a source of direct current for producing a continuous disengagement of ionized vapor from said vaporizable electrode.

12. In a rectifier for alternating currents, the combination of an exhausted receptacle or envelop, a source of alternating currents, electrodes for said receptacle such as to afford a plurality of paths for said currents through said receptacle, and means for rendering the interior of said receptacle or envelop at all times conductive for currents flowing in one direction, and means for utilizing the resulting unidirectional currents.

In witness whereof, I have hereunto set my hand this 20th day of March, 1903.

EZECHIEL WEINTRAUB.

Witnesses:
BENJAMIN B. HULL,
HELEN ORFORD.